United States Patent
Fuhrer

(10) Patent No.: US 8,156,796 B2
(45) Date of Patent: Apr. 17, 2012

(54) SENSOR ARRANGEMENT FOR A CLUTCH DEVICE

(75) Inventor: Kim Fuhrer, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 374 days.

(21) Appl. No.: 12/598,768

(22) PCT Filed: Apr. 24, 2008

(86) PCT No.: PCT/EP2008/054964

§ 371 (c)(1),
(2), (4) Date: Nov. 4, 2009

(87) PCT Pub. No.: WO2008/138722

PCT Pub. Date: Nov. 20, 2008

(65) Prior Publication Data

US 2010/0162807 A1  Jul. 1, 2010

(30) Foreign Application Priority Data

May 15, 2007 (DE) .......................... 10 2007 022 777

(51) Int. Cl.
*G01M 13/02* (2006.01)
(52) U.S. Cl. .................................................. 73/115.04
(58) Field of Classification Search ............... 73/114.77, 73/115.01, 115.02, 115.03, 115.04
See application file for complete search history.

(56) References Cited

U.S. PATENT DOCUMENTS

| 4,474,274 A | 10/1984 | Lutz et al. | |
|---|---|---|---|
| 5,058,718 A | 10/1991 | Tojima et al. | |
| 6,202,811 B1 | 3/2001 | Wallrafen | |
| 6,688,445 B2 * | 2/2004 | Otto .......................... | 192/85.51 |
| 7,854,162 B2 * | 12/2010 | Panzer et al. .............. | 73/115.04 |
| 2001/0030099 A1 | 10/2001 | Fliege | |
| 2003/0029692 A1 | 2/2003 | Rogner et al. | |
| 2008/0135371 A1 | 6/2008 | Gessler et al. | |

FOREIGN PATENT DOCUMENTS

| DE | 29 16 807 A1 | 12/1980 |
|---|---|---|
| DE | 197 14 775 A1 | 10/1998 |
| DE | 197 43 659 A1 | 4/1999 |
| DE | 100 39 242 A1 | 3/2001 |
| DE | 100 18 677 A1 | 10/2001 |
| DE | 10 2004 003 287 A1 | 8/2004 |
| DE | 10 2004 027 117 A1 | 12/2005 |
| DE | 10 2006 054 401 A1 | 5/2008 |
| EP | 1 923 591 A2 | 5/2008 |
| FR | 2 496 204 | 12/1981 |

* cited by examiner

*Primary Examiner* — Eric S McCall
(74) *Attorney, Agent, or Firm* — Davis & Bujold, P.L.L.C.

(57) ABSTRACT

A sensor arrangement (1) for a clutch device (22) comprising a housing (2) and a sensor part (5, 5') with at least one sensor (17) for detecting the position of a movable part (3) of the clutch device (22). The housing (2) has a recess (6) for the sensor part (5, 5') and the sensor part (5, 5') is fastened to a stationary part (2, 20). The sensor part (5, 5') may be positioned on the clutch device (22) from the outside through the recess (6) of the housing and detachably fastened to the stationary part (2, 20).

10 Claims, 3 Drawing Sheets

SENSOR ARRANGEMENT FOR A CLUTCH DEVICE

This application is a National Stage completion of PCT/EP2008/054964 filed Apr. 24, 2008, which claims priority from German patent application serial no. 10 2007 022 777.0 filed May 15, 2007.

FIELD OF THE INVENTION

The present invention relates to a sensor arrangement for a clutch device. The present invention further relates to a clutch device having such a sensor arrangement.

BACKGROUND OF THE INVENTION

Sensor arrangements are known from prior art which are primarily used for sensing displacements and/or detecting positions. Thus, in DE 10 2004 027 117 A1 a mechanism for detecting the stroke position of a clutch piston for actuating the clutch, which is arranged axially displaceable in a rotating clutch, is proposed, where the stroke position of the clutch piston is detected contactless. In this case, the sensor device comprises a sensor arranged in a transmission housing for the detection of the position of a magnet which is preferably arranged at the clutch piston.

DE 100 18 677 A1 describes a clutch system having a friction clutch and a corresponding actuating mechanism. A measuring arrangement comprises a coil bobbin and a measuring element. The measuring element is motionally coupled to a clutch disengaging piston and has a magnetic element. Upon axial movement of the clutch disengaging piston the magnetic element interacts with the coil bobbin in such a manner that an electric signal, which represents the axial position of the magnetic element and thus of the clutch disengaging piston, is transmitted to a control and/or regulating unit via electrical lines.

The undisclosed application by the applicant filed under No. 10 2006 054 401 discloses a sensor arrangement for a clutch device. The sensor arrangement comprises a separate sensor part, a connecting section, a position sensor and a signal line. The sensor part may be attached to a transmission and/or clutch housing via the mounting section. The position sensor is used for measuring the axial movement of a release cylinder of the clutch arrangement, a signal representing the position of the release cylinder being transmitted, via the signal line, to electronic controls. The sensor part is configured in such a manner that the mounting section and the connecting section are aligned to one another in a constant arrangement so that the connecting section is automatically connected to the electronic controls when the mounting section is attached to the transmission and/or clutch housing. During the assembly of the sensor part, it is thus ensured that the signal line is securely connected to the electronic controls.

A disadvantage of sensor arrangements from prior art is that the sensor for determining the position of a clutch disengaging mechanism is no longer accessible from the outside if the transmission is flange mounted to a drive unit, an internal combustion engine, for example. In case of a failure of the sensor, the transmission has consequently to be removed in order to replace the sensor.

SUMMARY OF THE INVENTION

The underlying object of the present invention is to provide an improved sensor arrangement, in particular for a clutch device, by means of which the disadvantages of prior art are eliminated.

The sensor arrangement according to the present invention, in particular for a clutch device for a motor vehicle for example, has a housing and a sensor part. The sensor part comprises at least one sensor for the detection of the position of a movable part of the clutch device, wherein the movable part of the clutch device may, for example, be configured as an axially displaceable clutch piston for actuating the clutch. The housing has a recess for the sensor part, and the sensor part may be fastened to a stationary part. The stationary part may for example be configured as a stationary part of the clutch device and/or as a housing of an adjacent transmission. For this purpose, the transmission housing may for example have a clutch bell, in which the clutch device is arranged. The stationary part of the clutch device may for example be configured as a clutch cylinder. According to the present invention, the recess for the sensor part is configured in such a manner that the sensor part may be positioned on the clutch device from the outside through the recess of the housing and detachably fastened to the stationary part. The position of a sensor transmitter, which is arranged on the movable part of the clutch device, is detected by means of the sensor arranged in and/or on the sensor part. The sensor transmitter may for example be configured as a magnetic element, and the sensor as an inductive sensor. The position of the sensor transmitter may be detected contactless by the sensor.

In a preferred embodiment of the sensor arrangement according to the present invention the sensor part is configured as a sensor arm and comprises at least one signal line and a connecting section, the signal line being arranged on one side between the sensor and the connecting section, and on the other side inside the sensor arm and/or adjacent to the sensor arm.

In an especially preferred embodiment of the sensor arrangement according to the present invention the sensor part configured as a sensor arm is configured in such a manner that the recess of the housing is closed in the assembly state, and the position of the movable part of the clutch arrangement may be detected by the sensor arranged in and/or on the sensor arm. By closing the recess of the housing by means of the sensor arm it is possible to prevent clutch dust from escaping from the clutch space into to environment.

In an advantageous embodiment of the sensor arrangement according to the present invention the sensor part comprises a cable, one end of the cable being connected to the sensor part and the other end of the cable having a connecting section. The end of cable connected to the sensor part is for example embedded in the sensor part and electrically connected to the sensor, soldered, for example. The end of the cable having the connecting section is led through the recess of the housing, where the connecting section may be fixed in a predetermined position, for example by means of a corresponding holding and/or locking device.

According to another embodiment of the sensor arrangement according to the present invention, an electrical connection between the connecting section of the sensor part and an electronic control device may be implemented via an integrated circuit package. The electronic control device and the integrated circuit package are advantageously arranged in a cover of the gear shift actuator, and the electrical connection between the connecting section of the sensor part and the integrated circuit package may be created during the assembly of the cover of the gear shift actuator, whereby the sensor is electrically connected to the electronic control device via the integrated circuit package. The cover of the gear shift actuator may for example be made of aluminum.

In an especially preferred embodiment of the sensor arrangement according to the present invention the recess in the housing is hermetically sealable by the cover of the gear shift actuator. This way, it may be ensured that neither dirt nor moisture can penetrate in the clutch space without the need for an additional cover to seal the recess. The assembly and logistic effort may therefore be consequently reduced.

By means of the sensor arrangement according to the present invention for the detection of the position of the movable part of the clutch device is freely accessible from the outside when the cover of the gear shift actuator is removed. If service is required, the sensor may thus be replaced without the need for removing the transmission that is flange mounted on a drive unit.

The clutch device according to the present invention, such as a clutch device in a vehicle, has a sensor arrangement of the type described above according to the present invention.

BRIEF DESCRIPTION OF THE DRAWINGS

The basic principle of the present invention, which allows various embodiments, is explained below in more detail by way of example with reference to a drawing. The drawing shows.

DETAILED DESCRIPTION OF THE PREFERRED EMBODIMENT

Figure 1:
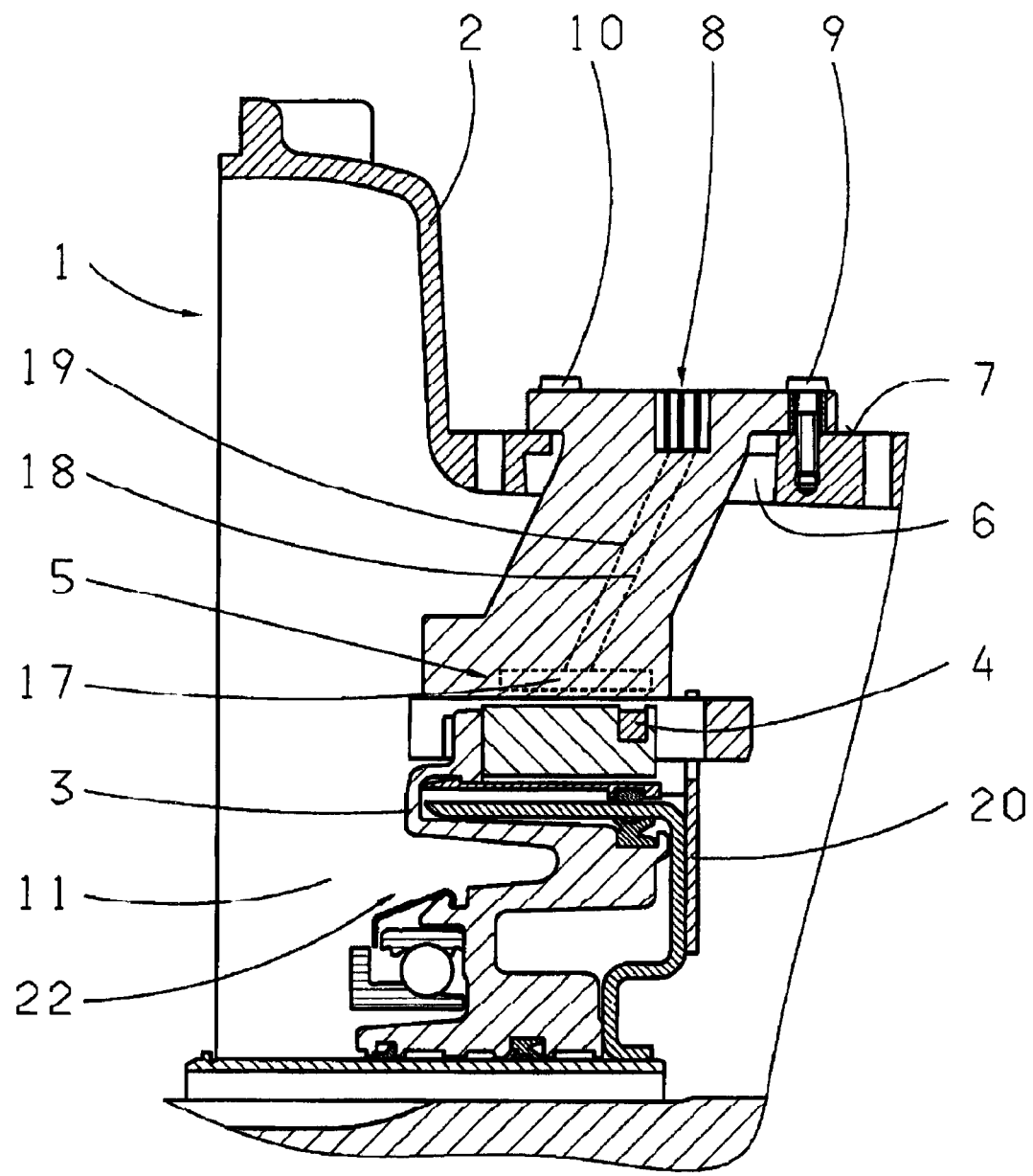
FIG. 1 a side view of an embodiment of the sensor arrangement according to the present invention in a partly sectional illustration, FIG. 2 the sensor arrangement according to FIG. 1 with a mounted cover of the gear shift actuator and FIG. 3 a side view of another embodiment of the sensor arrangement according to the present invention for a clutch device in a partly sectional illustration.

FIG. 1 shows an embodiment of the sensor arrangement 1 according to the present invention. A sensor part 5 is configured as a sensor arm and comprises a sensor 17, signal lines 18, 19 and a connecting section 8. The sensor 17 may for example be configured as an inductive sensor. The sensor 17 is connected, via signal lines 18, 19, to the connecting section 8, the signal lines 18, 19 being arranged between the sensor 17 on one side and the connecting section 8 inside the sensor arm 5 on the other side. The signal lines 18, 19 could basically also be arranged on the outside adjacent to the sensor arm 5, the arrangement located in the inside ensuring a secure transmission as well as a lower risk of damage.

The clutch device 22 has a stationary part 20 and a movable part 3, the stationary part 20 being configured as a clutch cylinder and the movable part 3 as an axially displaceable clutch piston for actuating the clutch. In addition, the clutch piston 3 has a sensor transmitter 4. The sensor transmitter 4 preferably consists of a magnetic element which is for example configured in the shape of a cube. In this case, the sensor transmitter 4 is motionally connected to the clutch piston 3. In case of axial movement of the clutch piston 3, the sensor transmitter 4 interacts with the sensor 17 in such a manner that an electric signal representing the axial position of the sensor transmitter 4 and thus of the clutch piston 3 is transmitted to an electronic control device (not shown here) via the signal lines 18, 19.

The sensor arm 5 is arranged on and/or in a housing 2, housing 2 being configured in this case as a transmission and/or clutch housing. The transmission and/or clutch housing 2 is configured as a stationary part with respect to other parts of the transmission or of the clutch and has a recess 6 for the sensor arm 5. The recess 6 is configured in such a manner that the sensor arm 5 may be positioned on the clutch device 22 from the outside through the recess 6 of the transmission and/or clutch housing 2. The sensor arm 5 extends through the clutch space 11 up to the sensor transmitter 4. The sensor arm 5 is fastened to the transmission and/or clutch housing 2 via corresponding fastening elements 9, 10 which in this case are preferably configured as bolted connections. The sensor arm 5 is configured in such a manner that it seals the recess 6 of the transmission and/or clutch housing 2 in the assembled state. In this connection, the sensor arm 5 abuts against a contact surface 7 of the transmission 2, which for example may be configured as a flange of the gear shift actuator.

Figure 2:
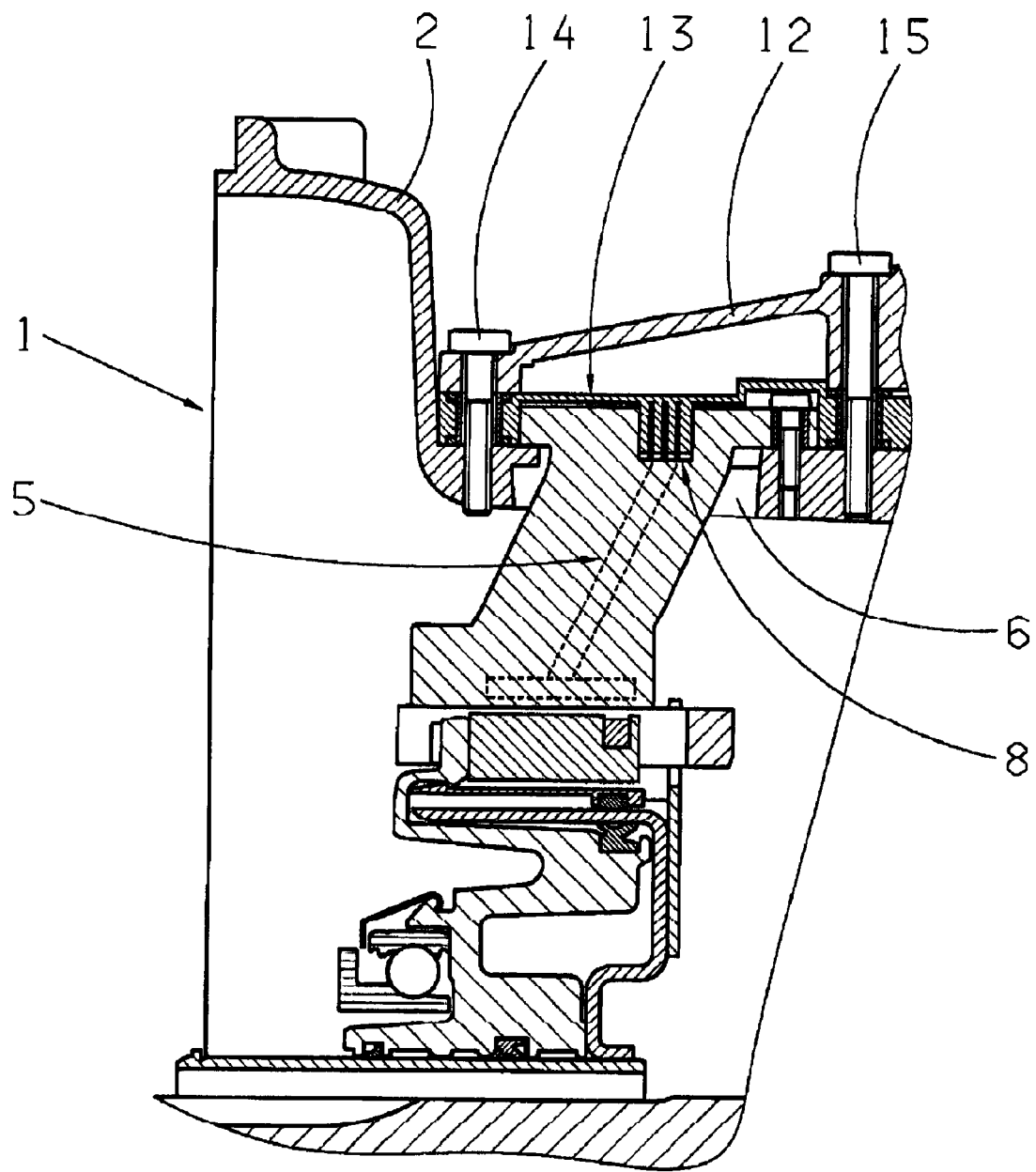

FIG. 2 shows the sensor arrangement 1 described in FIG. 1, an electrical connection being implemented between the connecting section 8 of the sensor arm 5 and an electronic control device (not shown here) via an integrated circuit package 13. The electronic control device and the integrated circuit package 13 are preferably arranged in the cover of the gear shift actuator 12. The connecting section 8 and the corresponding section of the integrated circuit package 13 are arranged with respect to one another in such a manner that upon assembly of the cover of the gear shift actuator 12, the electrical connection between the connecting section 12 of the sensor arm 5 and the integrated circuit package 13 is created. In addition, in this case, the recess 6 in the transmission and/or clutch housing 2 is hermetically sealed by the cover of the gear shift actuator 12, the cover of the gear shift actuator 12 being connectable to the transmission and/or clutch housing 12 via corresponding connecting elements 14, 15, preferably via bolted connections.

Figure 3:
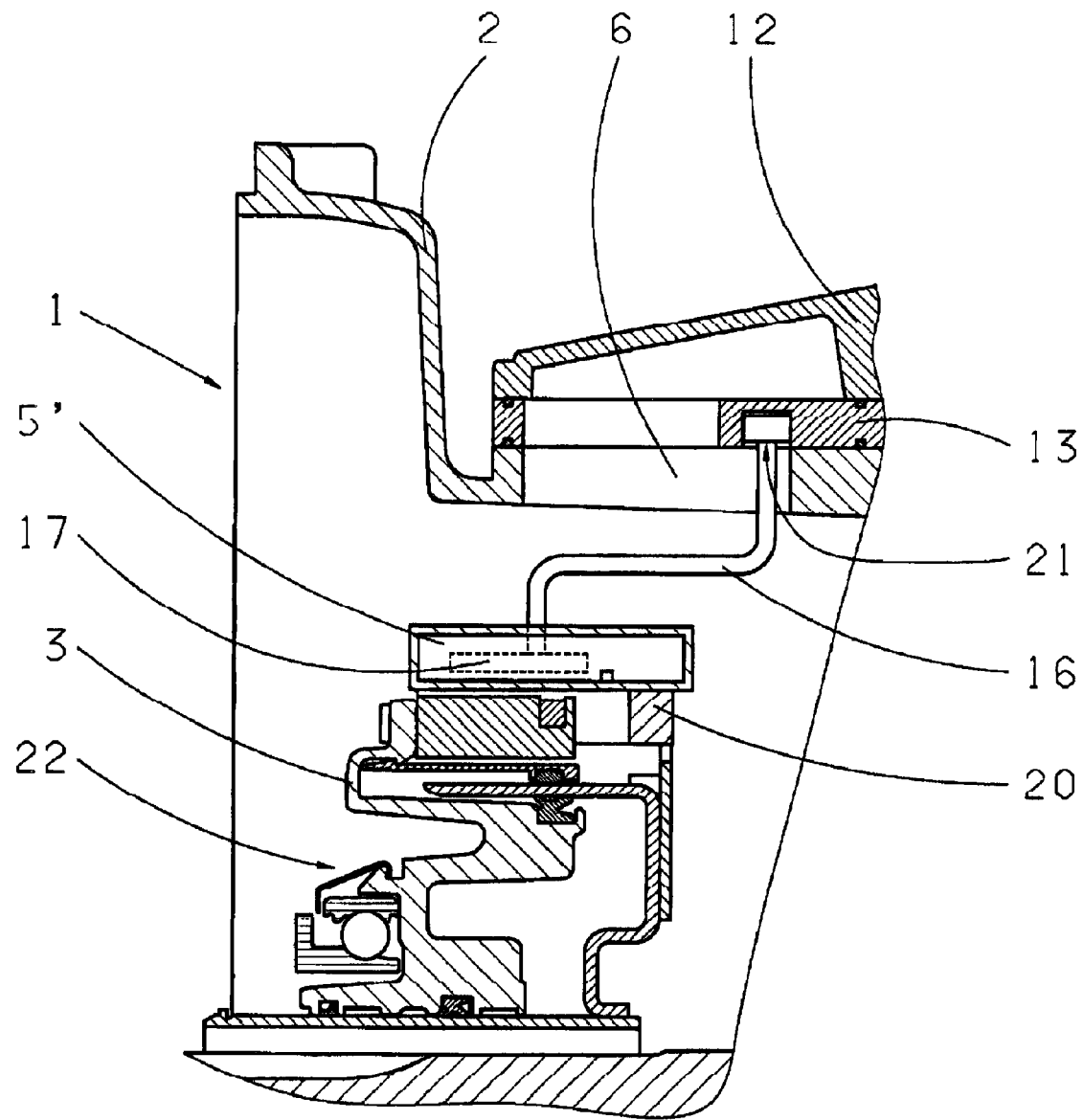

FIG. 3 shows another embodiment of the sensor arrangement 1 according to the present invention. A sensor part 5' is in this case detachably fastened to the clutch cylinder 20 of the clutch device 22, for example via bolted connections (not shown here). In this embodiment of the sensor arrangement 1 according to the present invention the recess 6 is likewise configured in the transmission and/or clutch housing 2 in such a manner that the sensor part 5' may be mounted and/or demounted on the clutch cylinder 20 from the outside. The sensor part 5' in this case comprises a cable 16, one end of the cable being connected to the sensor part 5' and the other end of the cable having a connecting section 21. The end of the cable connected to the sensor part 5' is for example embedded in the sensor part 5' and also electrically connected to the sensor 17, soldered, for example. The end of the cable having the connecting section 21 is led through the recess 6 of the transmission and/or clutch housing 2, the connecting section 21 being fixable in a predetermined position, for example by means of a corresponding holding device. Similarly to the description of FIG. 2, in this embodiment the electrical connection between the connecting section 21 of the sensor part 5' and the electronic control unit (not shown here) is likewise created via the integrated circuit package 13 during the assembly of the gear shift actuator 12, and the recess 6 hermetically sealed by the cover of the gear shift actuator 12.

REFERENCE NUMERALS 1 sensor arrangement
2 stationary part, transmission and/or clutch housing
3 movable part, clutch piston
4 sensor transmitter
5 sensor part, sensor arm
5' sensor part
6 sensor opening, recess
7 flange face of the gear shift actuator
8 connecting section
9 bolt connection 11 clutch arm
12 cover of the gear shift actuator
13 integrated circuit package
14 bolt connection
15 bolt connection
16 cable
17 sensor
18 signal line
19 signal line
20 stationary part, clutch cylinder
21 connecting section
22 clutch device

The invention claimed is:

1. A sensor arrangement (1) for a clutch device (22) comprising:
 a housing (2), and
 a sensor part (5, 5') having at least one sensor (17) for detecting a position of a movable part (3) of the clutch device (22),
 the housing (2) having a recess (6) for the sensor part (5, 5') and the sensor part (5, 5') being fastened to a stationary part (2, 20), and
 the stationary part (20) of the clutch device (22) being configured as a clutch cylinder, and the movable part (3) of the clutch device (22) as an axially displaceable clutch piston for actuating the clutch,
 wherein the recess (6) for the sensor part (5, 5') is configured such that the sensor part (5, 5') is positioned on the clutch device (22) from the outside through the recess (6) of the housing (2) and detachably fastened to the stationary part (2, 20).

2. The sensor arrangement (1) according to claim 1, wherein the recess (6) in the housing is hermetically sealable by the cover of the gear shift actuator (12).

3. The sensor arrangement (1) according to claim 1, wherein the stationary part (2, 20) is at least one of a stationary part (20) of the clutch device (22), a housing (2) of the clutch device (22) and an adjacent transmission.

4. The sensor arrangement (1) according to claim 1, wherein the sensor part (5) is a sensor arm and comprises at least one signal line (18, 19) and a connecting section (8), and the signal line (18, 19) is arranged between the sensor (17), on one side, and the connecting section (8), on another side, at least one of inside the sensor arm and adjacent the sensor arm.

5. The sensor arrangement (1) according to claim 4, wherein the sensor arm (5) is configured such that, in an assembled state of the sensor arm (5), the recess (6) of the housing (2) is sealed and the position of the movable part (3) is securely detectable by the sensor (17) arranged at least one of in and on the sensor arm (5).

6. The sensor arrangement (1) according to claim 1, wherein the sensor part (5') comprises a cable (16), and one end of the cable is connected to the sensor part (5') and an opposite end of the cable has a connecting section (21).

7. The sensor arrangement (1) according to claim 6, wherein the end of the cable connected to the sensor part (5') is embedded in the sensor part (5') and electrically connected to the sensor (17), and the opposite end of the cable, which has the connecting section (21), is led through the recess (6) of the housing (2), and the connecting section (21) is fixable in a predetermined position.

8. The sensor arrangement (1) according to claim 7, wherein an electrical connection is implemented, via an integrated circuit package (13), between the connecting part (8, 21) of the sensor part (5, 5') and an electronic control device.

9. The sensor arrangement (1) according to claim 8, wherein the electronic control device and the integrated circuit package (13) is arranged in a cover of the gear shift actuator (12), and the electrical connection, between the connecting section (8, 21) of the sensor part (5, 5') and the integrated circuit package (13), is created during assembly of the cover of the gear shift actuator (12).

10. A clutch device (22) in combination with a sensor arrangement (1) comprising a housing (2) and a sensor part (5, 5') having at least one sensor (17) for detecting a position of a movable part (3) of the clutch device (22), the housing (2) having a recess (6) for the sensor part (5, 5') and the sensor part (5, 5') being fastened to a stationary part (2, 20), and the stationary part (20) of the clutch device (22) being configured as a clutch cylinder, and the movable part (3) of the clutch device (22) as an axially displaceable clutch piston for actuating the clutch,
 wherein the recess (6) for the sensor part (5, 5') being configured such that the sensor part (5, 5') is positioned on the clutch device (22) from the outside through the recess (6) of the housing (2) and detachably fastened to the stationary part (2, 20).

* * * * *